US012725613B2

(12) United States Patent
Sakaguchi et al.

(10) Patent No.: US 12,725,613 B2
(45) Date of Patent: Sep. 1, 2026

(54) IMAGE FORMING APPARATUS

(71) Applicant: KYOCERA Document Solutions Inc., Osaka (JP)

(72) Inventors: Shoichi Sakaguchi, Osaka (JP); Fumiya Sakashita, Osaka (JP); Junpei Takada, Osaka (JP); Yumi Hirobe, Osaka (JP); Takuma Fujikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 96 days.

(21) Appl. No.: 18/705,060

(22) PCT Filed: Jul. 20, 2023

(86) PCT No.: PCT/JP2023/026674
§ 371 (c)(1),
(2) Date: Apr. 26, 2024

(87) PCT Pub. No.: WO2024/024642
PCT Pub. Date: Feb. 1, 2024

(65) Prior Publication Data

US 2025/0037713 A1 Jan. 30, 2025

(30) Foreign Application Priority Data

Jul. 29, 2022 (JP) ................................ 2022-121284

(51) Int. Cl.
*G10L 15/22* (2006.01)
*H04N 1/00* (2006.01)

(52) U.S. Cl.
CPC ......... *G10L 15/22* (2013.01); *H04N 1/00403* (2013.01); *G10L 2015/223* (2013.01)

(58) Field of Classification Search
USPC ...................................................... 704/1–504
See application file for complete search history.

(56) References Cited

U.S. PATENT DOCUMENTS

2014/0369731 A1* 12/2014 Yasukawa ............. G03G 15/50 399/407
2017/0206064 A1* 7/2017 Breazeal .................. G06F 8/36
2018/0285066 A1 10/2018 Dozen
2019/0035395 A1* 1/2019 Yumoto .................. G06F 3/167
2019/0362708 A1* 11/2019 Kitaguchi ............... G06F 3/167
2020/0148497 A1* 5/2020 Yokoyama ............. B65H 37/04
(Continued)

FOREIGN PATENT DOCUMENTS

CN 113449068 B * 7/2025 ............. G10L 17/18
JP 2018169442 A 11/2018
(Continued)

*Primary Examiner* — Marcus T Riley
(74) *Attorney, Agent, or Firm* — IP Business Solutions, LLC

(57) ABSTRACT

An image forming apparatus includes: a receiver that receives a manual input operation via an operation device and a voice instruction via a microphone; and a controller that executes a job on the basis of setting received by the receiver. The controller performs control of not executing a predefined job of the image forming apparatus when the microphone is brought into a state where voice is input and executing the predefined job when the microphone is not in the state where voice is input.

6 Claims, 11 Drawing Sheets

(56) References Cited

U.S. PATENT DOCUMENTS

| | | | | |
|---|---|---|---|---|
| 2020/0195805 | A1* | 6/2020 | Matsubara | H04N 1/00896 |
| 2020/0344369 | A1* | 10/2020 | Okumura | H04N 1/00474 |
| 2025/0037713 | A1* | 1/2025 | Sakaguchi | G10L 15/22 |
| 2025/0321708 | A1* | 10/2025 | Treat | G06F 3/167 |

FOREIGN PATENT DOCUMENTS

| | | | |
|---|---|---|---|
| JP | 2019205052 | A | 11/2019 |
| JP | 2020098383 | A | 6/2020 |

* cited by examiner

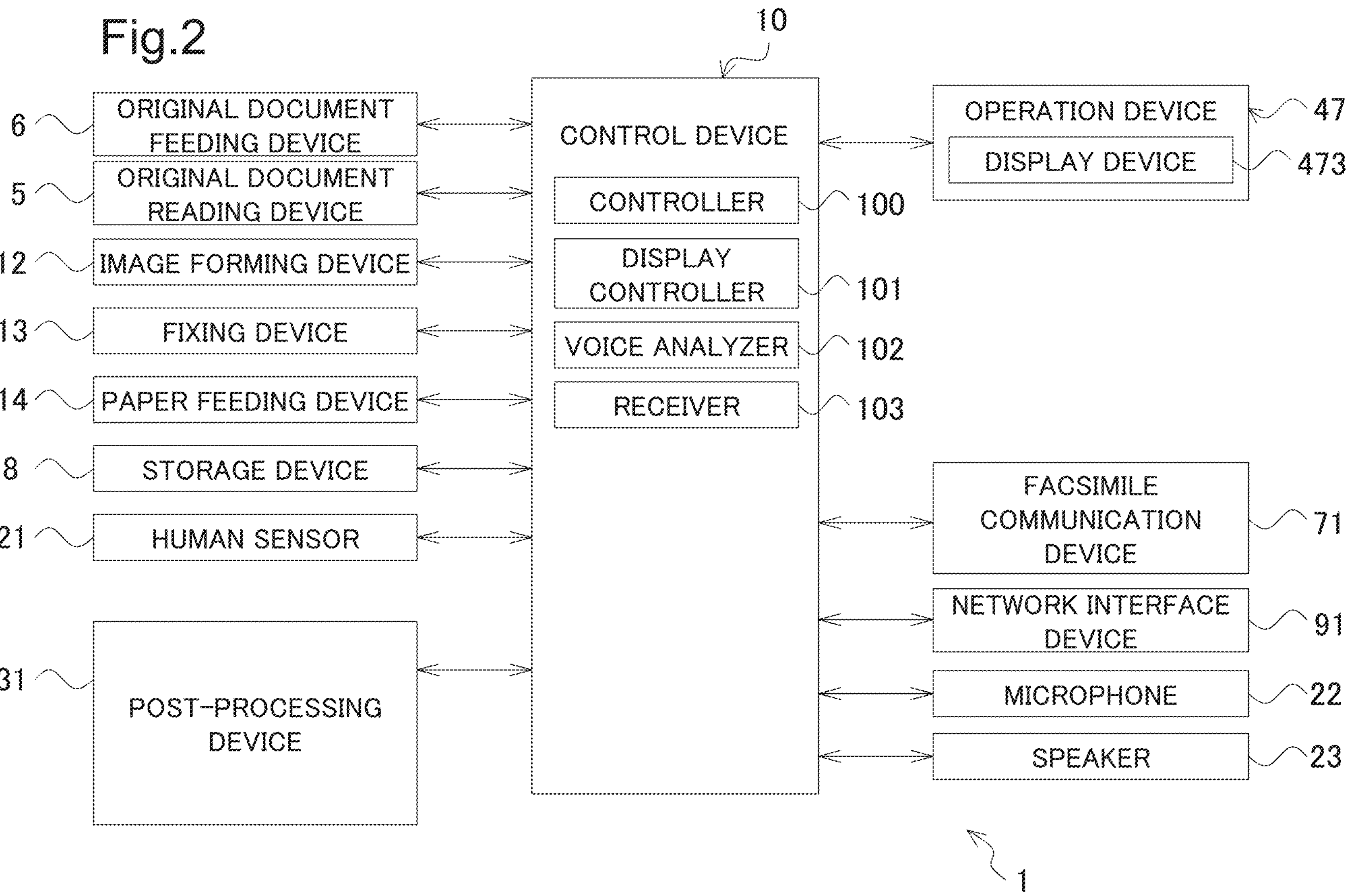
Fig.2
10
6
ORIGINAL DOCUMENT FEEDING DEVICE
5
ORIGINAL DOCUMENT READING DEVICE
12
IMAGE FORMING DEVICE
13
FIXING DEVICE
14
PAPER FEEDING DEVICE
8
STORAGE DEVICE
21
HUMAN SENSOR
31
POST-PROCESSING DEVICE
CONTROL DEVICE
CONTROLLER
100
DISPLAY CONTROLLER
101
VOICE ANALYZER
102
RECEIVER
103
OPERATION DEVICE
47
DISPLAY DEVICE
473
FACSIMILE COMMUNICATION DEVICE
71
NETWORK INTERFACE DEVICE
91
MICROPHONE
22
SPEAKER
23
1

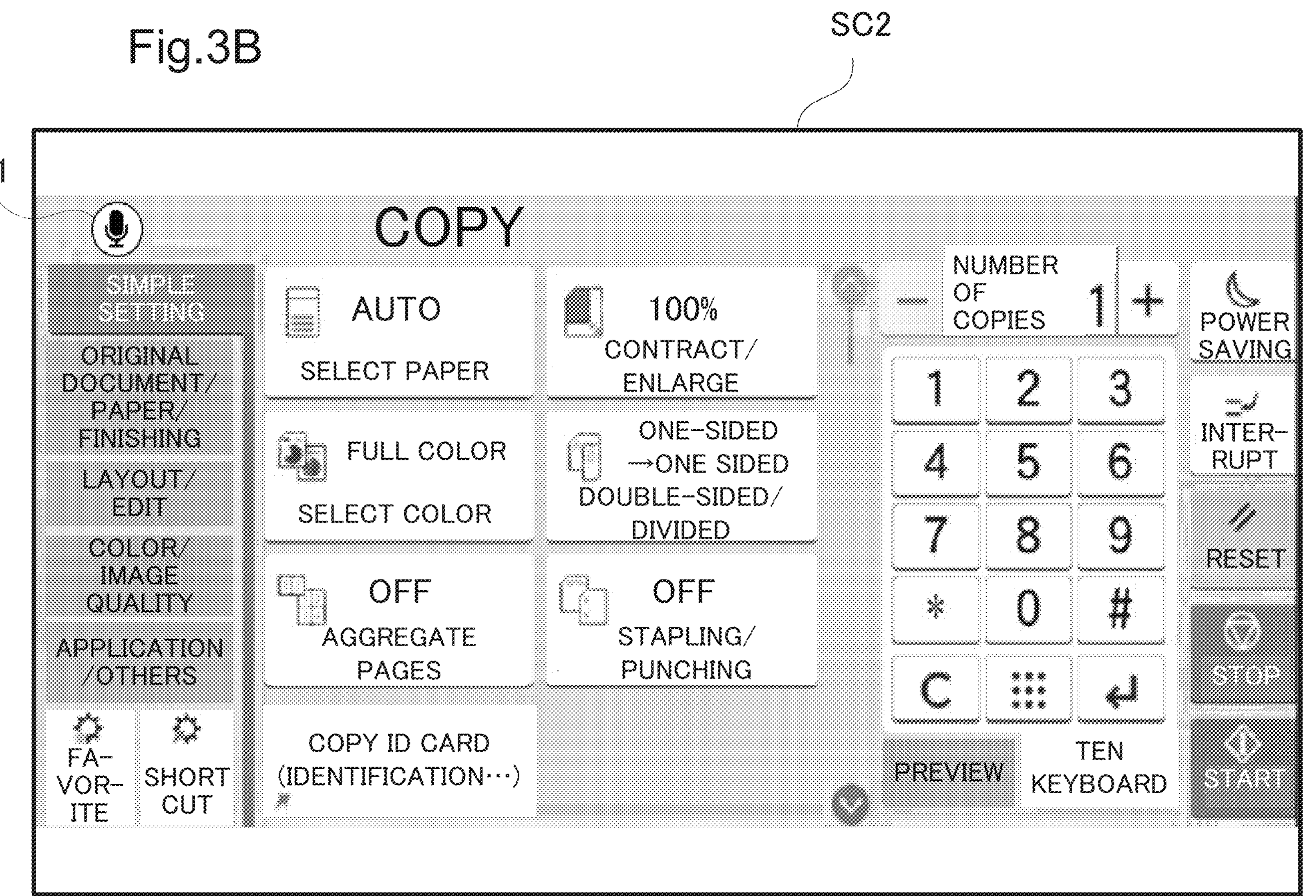
Fig.3B
SC2
G1
COPY
SIMPLE SETTING
ORIGINAL DOCUMENT/ PAPER/ FINISHING
LAYOUT/ EDIT
COLOR/ IMAGE QUALITY
APPLICATION /OTHERS
FA-VOR-ITE
SHORT CUT
AUTO
SELECT PAPER
100%
CONTRACT/ ENLARGE
FULL COLOR
SELECT COLOR
ONE-SIDED →ONE SIDED DOUBLE-SIDED/ DIVIDED
OFF
AGGREGATE PAGES
OFF
STAPLING/ PUNCHING
COPY ID CARD (IDENTIFICATION…)
−
NUMBER OF COPIES
1
+
1 2 3
4 5 6
7 8 9
* 0 #
C
PREVIEW
TEN KEYBOARD
POWER SAVING
INTER-RUPT
RESET
STOP
START

SC1
G2
POWER SAVING
RESET
USER BOX
FAX
SEND
COPY
INTERNET
SYSTEM SETTING

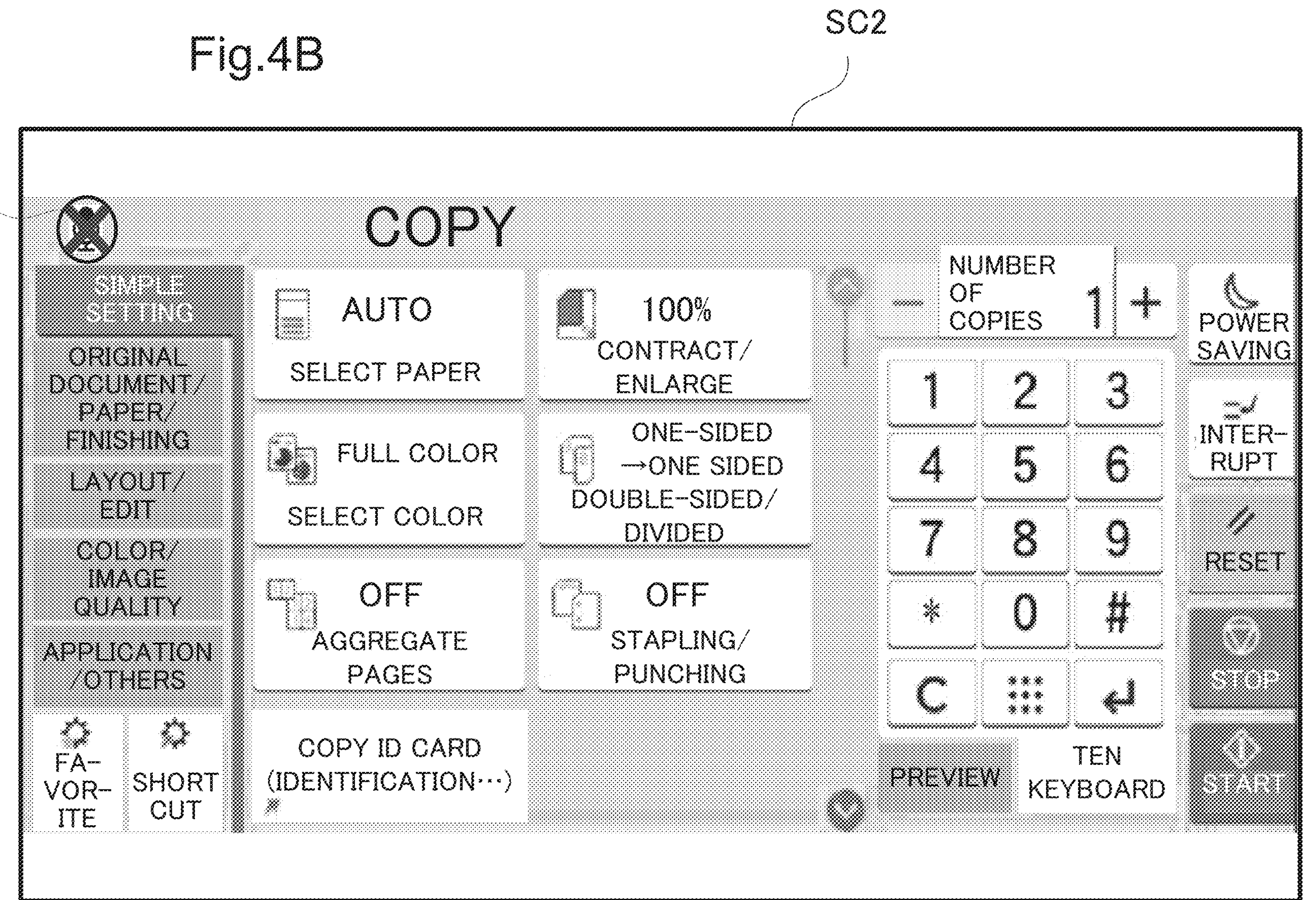
Fig.4B
SC2
G2
COPY
SIMPLE SETTING
ORIGINAL DOCUMENT/ PAPER/ FINISHING
LAYOUT/ EDIT
COLOR/ IMAGE QUALITY
APPLICATION /OTHERS
FA-VOR-ITE
SHORT CUT
AUTO
SELECT PAPER
100%
CONTRACT/ ENLARGE
FULL COLOR
SELECT COLOR
ONE-SIDED →ONE SIDED
DOUBLE-SIDED/ DIVIDED
OFF
AGGREGATE PAGES
OFF
STAPLING/ PUNCHING
COPY ID CARD (IDENTIFICATION…)
NUMBER OF COPIES
1
−
+
1
2
3
4
5
6
7
8
9
*
0

C
PREVIEW
TEN KEYBOARD
POWER SAVING
INTER-RUPT
RESET
STOP
START

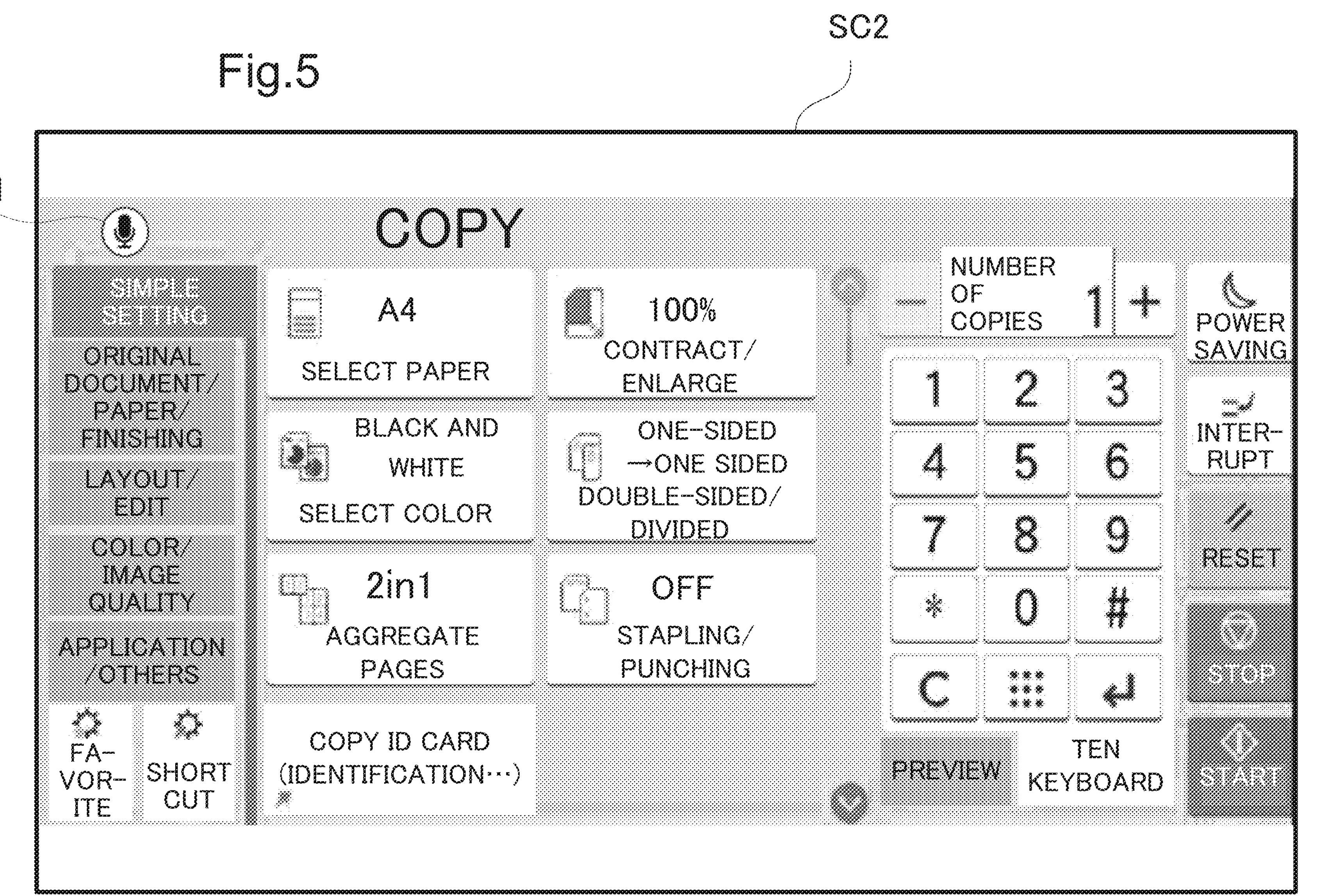
Fig.5
SC2
G1
COPY
SIMPLE SETTING
ORIGINAL DOCUMENT/ PAPER/ FINISHING
LAYOUT/ EDIT
COLOR/ IMAGE QUALITY
APPLICATION /OTHERS
FA- VOR- ITE
SHORT CUT
A4
SELECT PAPER
BLACK AND WHITE
SELECT COLOR
2in1
AGGREGATE PAGES
COPY ID CARD (IDENTIFICATION···)
100%
CONTRACT/ ENLARGE
ONE-SIDED →ONE SIDED
DOUBLE-SIDED/ DIVIDED
OFF
STAPLING/ PUNCHING
NUMBER OF COPIES
1
PREVIEW
TEN KEYBOARD
POWER SAVING
INTER- RUPT
RESET
STOP
START

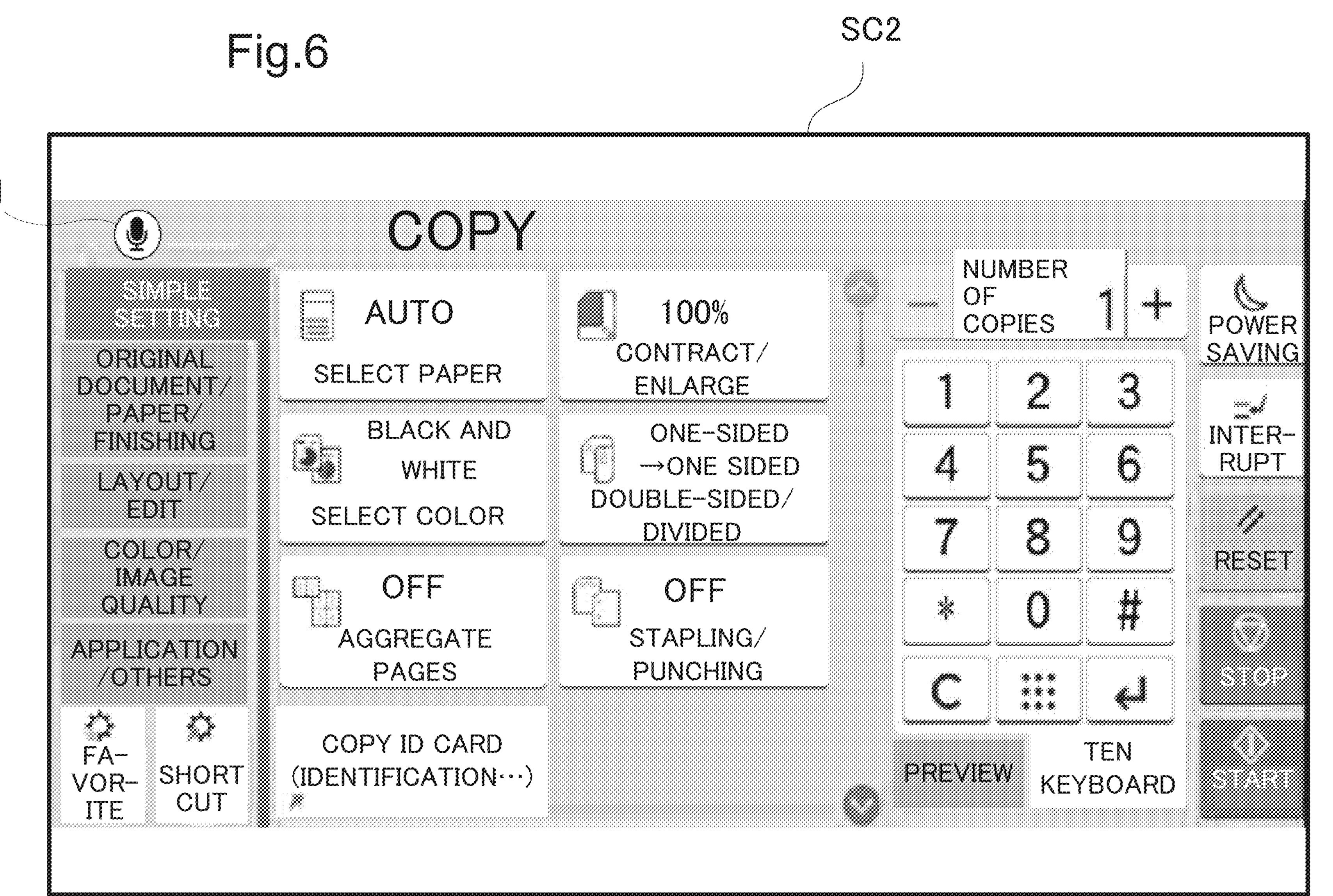
Fig.6
SC2
G1
COPY
SIMPLE SETTING
ORIGINAL DOCUMENT/ PAPER/ FINISHING
LAYOUT/ EDIT
COLOR/ IMAGE QUALITY
APPLICATION /OTHERS
FA-VOR-ITE
SHORT CUT
AUTO
SELECT PAPER
100%
CONTRACT/ ENLARGE
BLACK AND WHITE
SELECT COLOR
ONE-SIDED →ONE SIDED DOUBLE-SIDED/ DIVIDED
OFF
AGGREGATE PAGES
OFF
STAPLING/ PUNCHING
COPY ID CARD (IDENTIFICATION···)
–
NUMBER OF COPIES
1
+
1 2 3
4 5 6
7 8 9
* 0 #
C
PREVIEW
TEN KEYBOARD
POWER SAVING
INTER-RUPT
RESET
STOP
START

Fig.9

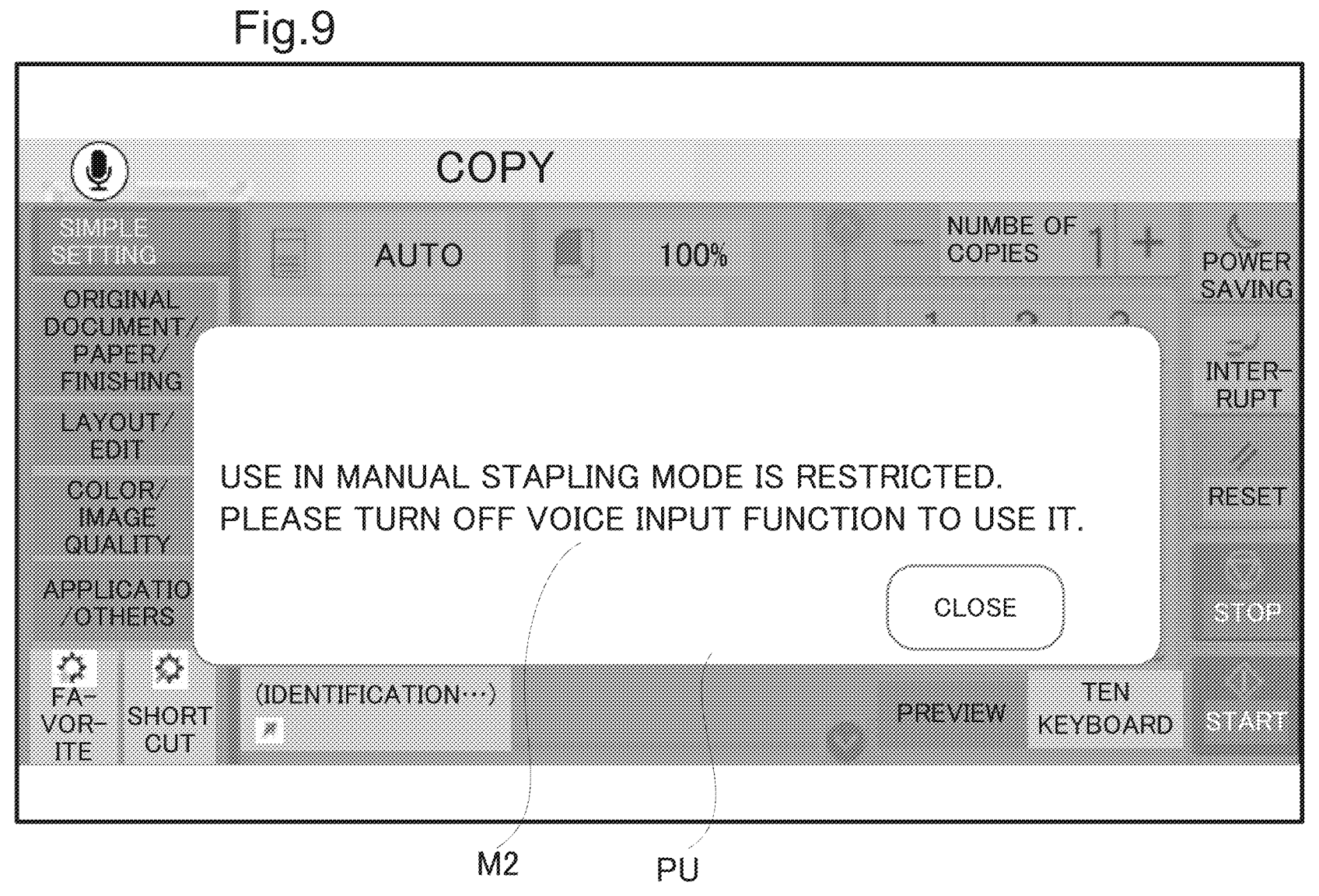

COPY
SIMPLE SETTING
ORIGINAL DOCUMENT/ PAPER/ FINISHING
LAYOUT/ EDIT
COLOR/ IMAGE QUALITY
APPLICATIO OTHERS
FA-VOR-ITE
SHORT CUT
AUTO
100%
NUMBE OF COPIES
1
POWER SAVING
INTER-RUPT
RESET
STOP
START
USE IN MANUAL STAPLING MODE IS RESTRICTED.
PLEASE TURN OFF VOICE INPUT FUNCTION TO USE IT.
CLOSE
(IDENTIFICATION··)
PREVIEW
TEN KEYBOARD
M2
PU

IMAGE FORMING APPARATUS

TECHNICAL FIELD

The present invention relates to an image forming apparatus that allows voice instructions.

Some image forming apparatuses such as copy machines and multi-functional machines include operation panels for users to perform manual input operations. A user can select one function from among a plurality of functions (such as a copy function, a scanner function, and a facsimile function, for example) and perform setting for the function by performing operations via the operation panels.

Also, various image forming apparatuses that allow voice instructions have been proposed and put into practical use. For example, Patent Literature 1 listed below describes that content of a voice instruction is reflected in job setting, and Patent Literature 2 listed below describes that job history information intended by a user is narrowed down from a plurality of pieces of job history information on the basis of a keyword included in user voice.

CITATION LIST

Patent Literature

Patent Literature 1

Japanese Patent Unexamined Patent Application Publication No. 2020-098383

Patent Literature 2

Japanese Patent Unexamined Patent Application Publication No. 2019-205052

SUMMARY OF INVENTION

However, if noise is mixed into input voice, there is a concern that an utterance of a user may not accurately be recognized and an operation based on the voice instruction intended by the user may not be realized. In a case where a finisher or the like that causes relatively large driving sound is operating, in particular, there is a concern that an utterance of the user may not accurately be recognized. However, the inventions described in Patent Literatures 1 and 2 listed above cannot solve the problem in regard to voice recognition under such noise as described above.

The present invention was made in view of the above circumstances, and an object thereof is to enable a situation in which a voice instruction is not accurately input due to noise or the like to be avoided.

An image forming apparatus according to an aspect of the present invention is an image forming apparatus that includes an image forming device that forms an image on a recording medium, the image forming apparatus including: a voice input device that receives an input of voice from a user; a receiver that receives a voice instruction based on the voice input to the voice input device; and a controller that executes a job in accordance with content of the voice instruction received by the receiver, in which the controller performs control of not executing a predefined job at least for a predefined period of time when the voice input device is brought into a state where voice is input, and executing the predefined job when the voice input device is not in a state where voice is input.

According to the present invention, the predefined job is not executed in a state where voice input to the voice input device is received, and it is thus possible to avoid a situation in which a voice instruction is not accurately input due to noise or the like by setting a job for which the image forming apparatuses causes large sound as the predefine job, for example.

BRIEF DESCRIPTION OF DRAWINGS

FIG. 2 is a functional block diagram schematically illustrating main internal configurations of the image forming apparatus.

FIGS. 3A and 3B are diagrams illustrating an example of an operation screen displayed on a display device.

FIGS. 4A and 4B are diagrams illustrating an example of the operation screen displayed on the display device.

FIG. 5 is a diagram illustrating an example of the operation screen displayed on the display device.

FIG. 6 is a diagram illustrating an example of the operation screen displayed on the display device.

FIG. 9 is a diagram illustrating an example of the operation screen displayed on the display device.

DESCRIPTION OF EMBODIMENTS

Figure 1:
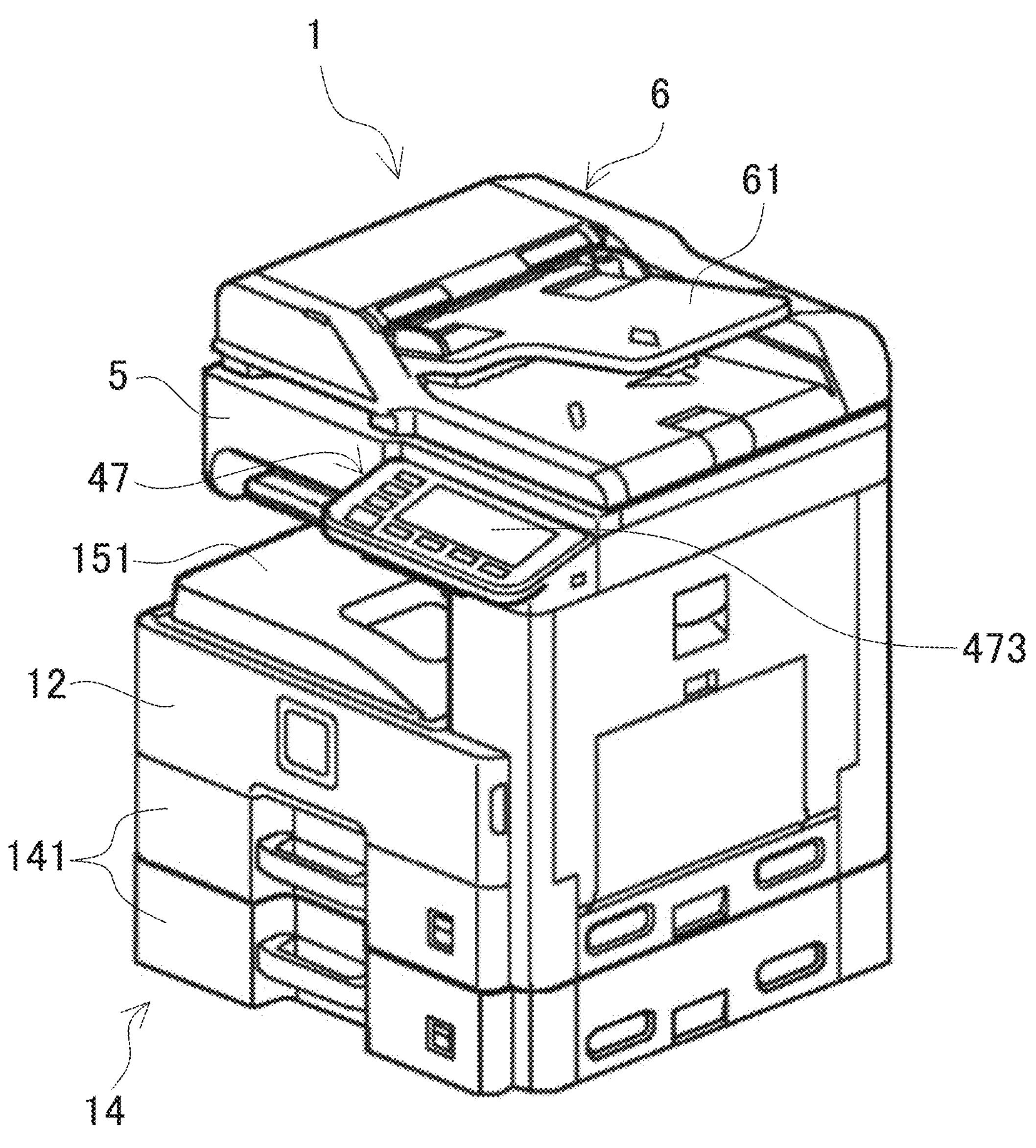
FIG. 1 is a perspective view illustrating the exterior of an image forming apparatus according to an embodiment of the present invention.

Hereinafter, an image forming apparatus according to an embodiment of the present invention will be described with reference to the drawings. FIG. 1 is a perspective view illustrating the exterior of the image forming apparatus according to the embodiment of the present invention. FIG. 2 is a functional block diagram schematically illustrating main internal configurations of the image forming apparatus. An image forming apparatus 1 according to a first embodiment is a multi-function machine that is equipped with a plurality of functions such as a copy function, a printer function, a scanner function, and a facsimile function, for example, and is configured to include an original document feeding device 6, an original document reading device 5, an image forming device 12, a fixing device 13, a paper feeding device 14, a storage device 8, a human sensor 21, an operation device 47, a facsimile communication device 71, a network interface device 91, a microphone 22, and a speaker 23. Also, the image forming apparatus 1 is configured such that a post-processing device 31 can be connected.

The post-processing device 31 is called a finisher and performs stapling and punching on a recording paper with an image printed thereon. Also, the post-processing device 31 can perform switching between an automatic stapling mode of automatically performing the stapling and a manual stapling mode of manually performing the stapling. Note that the post-processing device 31 operates under control performed by the image forming apparatus 1.

An original document feeding device 6 is configured on an upper surface of the original document reading device 5 such that the original document feeding device 6 can be opened and closed with a hinge, which is not illustrated, and the original document feeding device 6 functions as an original document pressing cover in a case where an original document placed on a platen glass, which is not illustrated, is read. Also, the original document feeding device 6 is called an auto document feeder (ADF) or a document processor (DP), includes an original document placement tray 61, and supplies an original document placed on the original document placement tray 61 one by one to the original document reading device 5.

A case where the image forming apparatus 1 performs an original document reading operation will be described. The original document reading device 5 optically reads an image in the original document supplied to the original document reading device 5 by the original document feeding device 6 or the original document placed on the platen glass and generates image data. The image data generated by the original document reading device 5 is saved in an image memory or the like, which is not illustrated.

A case where the image forming apparatus 1 performs an image forming operation will be described. The image forming device 12 forms an image on a recording paper as a recording medium supplied from the paper feeding device 14 on the basis of the image data generated by the original document reading operation or image data received from a computer as an external device (a personal computer, for example) connected via a network.

The fixing device 13 is adapted to heat and pressurize the recording paper with a toner image formed thereon by the image forming device 12 and fix the toner image on the recording paper, and the recording paper on which the fixation processing has been performed is discharged to a discharge tray 151. The paper feeding device 14 includes a plurality of paper supply cassettes 141.

The storage device 8 is a large-capacity storage device such as a hard disk drive (HDD) or a solid state drive (SSD) and stores various control programs and the like. The human sensor 21 detects a person approaching the image forming apparatus 1. As the human sensor 21, a sensor that detects infrared rays emitted from a human body, for example, is used.

The operation device 47 receives instructions such as an image forming operation executing instruction from an operator in regard to various operations and processing that can be performed by the image forming apparatus 1. The operation device 47 includes a display device 473 that displays an operation guide and the like for the operator. Also, the operation device 47 receives inputs of instructions from a user on the basis of operations (touch operations) performed by the user on an operation screen displayed on the display device 473 via a touch panel included in the display device 473 and operations performed by the user on physical keys.

The display device 473 is configured of a liquid crystal display (LCD) or the like. The display device 473 includes a touch panel. Once the operator performs an operation of touching a button or a key displayed on the screen, an instruction corresponding to the position where the touch operation has been performed is received by the touch panel.

The facsimile communication device 71 includes encoding/decoding and modulation/demodulation devices and a network control unit (NCU), which are not illustrated, and performs facsimile transmission/reception by using a public telephone network or the like.

The network interface device 91 is a communication interface that transmits/receives various kinds of data to and from an external device (a personal computer, for example) in a local area or on the Internet.

The microphone 22 is a voice input device that collects sound in the surroundings of the image forming apparatus 1 and converts the sound into an electrical signal (voice data). Note that the microphone 22 is provided at an appropriate location where it is easy to collect voice of an utterance of the user, for example, in the operation device 47.

The speaker 23 outputs various kinds of voice such as operation sounds and effect sounds when the operation device 47 is operated, guidance voice for explaining an operation method, and an alert sound in a case where some trouble occurs in the image forming apparatus 1. For example, the speaker 23 is provided at a location where the speaker 23 is not visible from the outside of the image forming apparatus 1, for example, inside the operation device 47.

The control device 10 is configured to include a processor, a random access memory (RAM), a read only memory (ROM), and a dedicated hardware circuit. The processor is, for example, a central processing unit (CPU), an application specific integrated circuit (ASIC), or a micro processing unit (MPU). The control device 10 includes a controller 100, a display controller 101, a voice analyzer 102, and a receiver 103.

The control device 10 is adapted to function as the controller 100, the display controller 101, the voice analyzer 102, and the receiver 103 by operations of the processor in accordance with a control program stored in the storage device 8. However, each of the controller 100 and the like can also be configured by a hardware circuit without depending on operations in accordance with the control program of the control device 10. Hereinafter, the same applies to each embodiment unless otherwise particularly stated.

The controller 100 is in charge of overall operation control of the image forming apparatus 1. The controller 100 is connected to the original document feeding device 6, the original document reading device 5, the image forming device 12, the fixing device 13, the paper feeding device 14, the storage device 8, the human sensor 21, the operation device 47, the facsimile communication device 71, the network interface device 91, the microphone 22, the speaker 23, and a post-processing device 31, and performs drive control and the like on each of these components. For example, the controller 100 controls operations of the image forming device 12 and the like and causes an original document image obtained by the original document reading device 5 through reading to be formed on recording paper as a recording medium.

Also, once an approaching person is detected by the human sensor 21, the controller 100 controls the microphone 22 to bring the microphone 22 into an ON state to enable a voice input to the microphone 22, and if a predefined time (30 seconds, for example) elapses after the approaching person is no longer detected by the human sensor 21, the controller 100 controls the microphone 22 and brings the microphone 22 into an OFF state. Note that the ON/OFF switching of the microphone 22 can also be performed by the controller 100 in accordance with an instruction input to the operation device 47.

The display controller 101 controls display operations of the display device 473. For example, the display controller 101 displays, on the display device 473, a selection screen for allowing the user to select a function to be executed from among the plurality of functions that can be executed by the image forming apparatus 1 and displays, on the display device 473, a setting screen for receiving an input related to setting for each function in a lower layer than the selection screen.

Figure 3A:
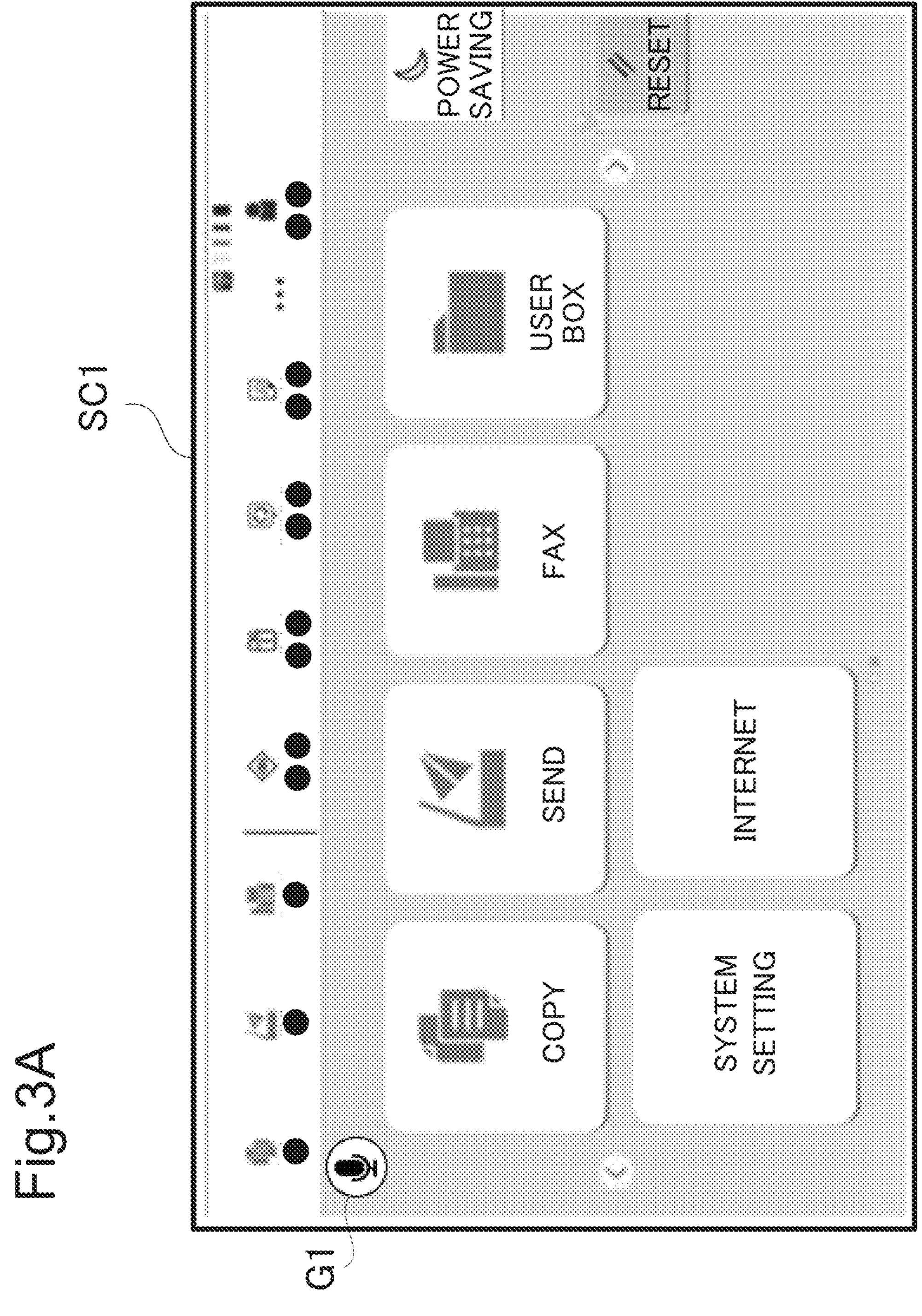

FIGS. 3A and 3B are diagrams illustrating examples of a screen displayed on the display device 473. An operation screen SC1 illustrated in FIG. 3A is a selection screen for allowing the user to select a function to be executed from among the plurality of functions that can be executed by the image forming apparatus 1. On the operation screen SC1, a “copy” button, a “send (scanner function)” button, a “fax (facsimile function)” button, and the like are displayed. Note that the operation screen SC1 of the above selection screen is also a home screen. Once the “copy” button is pressed by the user, the operation device 47 receives a copy function selection instruction, and the controller 100 causes the display device 473 to display an operation screen SC2 illustrated in FIG. 3B in response to the instruction.

The operation screen SC2 is displayed as a lower hierarchy than the “home” screen on the display device 473. The operation screen SC2 is a setting screen for receiving an input related to setting of the “copy” function. Six buttons with descriptions of “Select paper”, “Select color”, “Aggregate pages”, “Contract/Enlarge”, “Double-sided/Divided”, and “Stapling/Punching” are displayed at the center of the setting screen for the “copy” function. These buttons are images for receiving settings related to the “copy” function.

A sign G1 for an illustration of microphone is displayed on the operation screen SC1 illustrated in FIG. 3A and the operation screen SC2 illustrated in FIG. 3B (the left upper portion in FIGS. 3A and 3B). The display of the sign G1 indicates that it is possible to input voice to the microphone 22 in the state. In other words, the controller 100 turns on the microphone 22 and causes the operation screen SC2 to display the sign G1 when the microphone 22 is in the state where a voice input is possible.

Figure 4A:
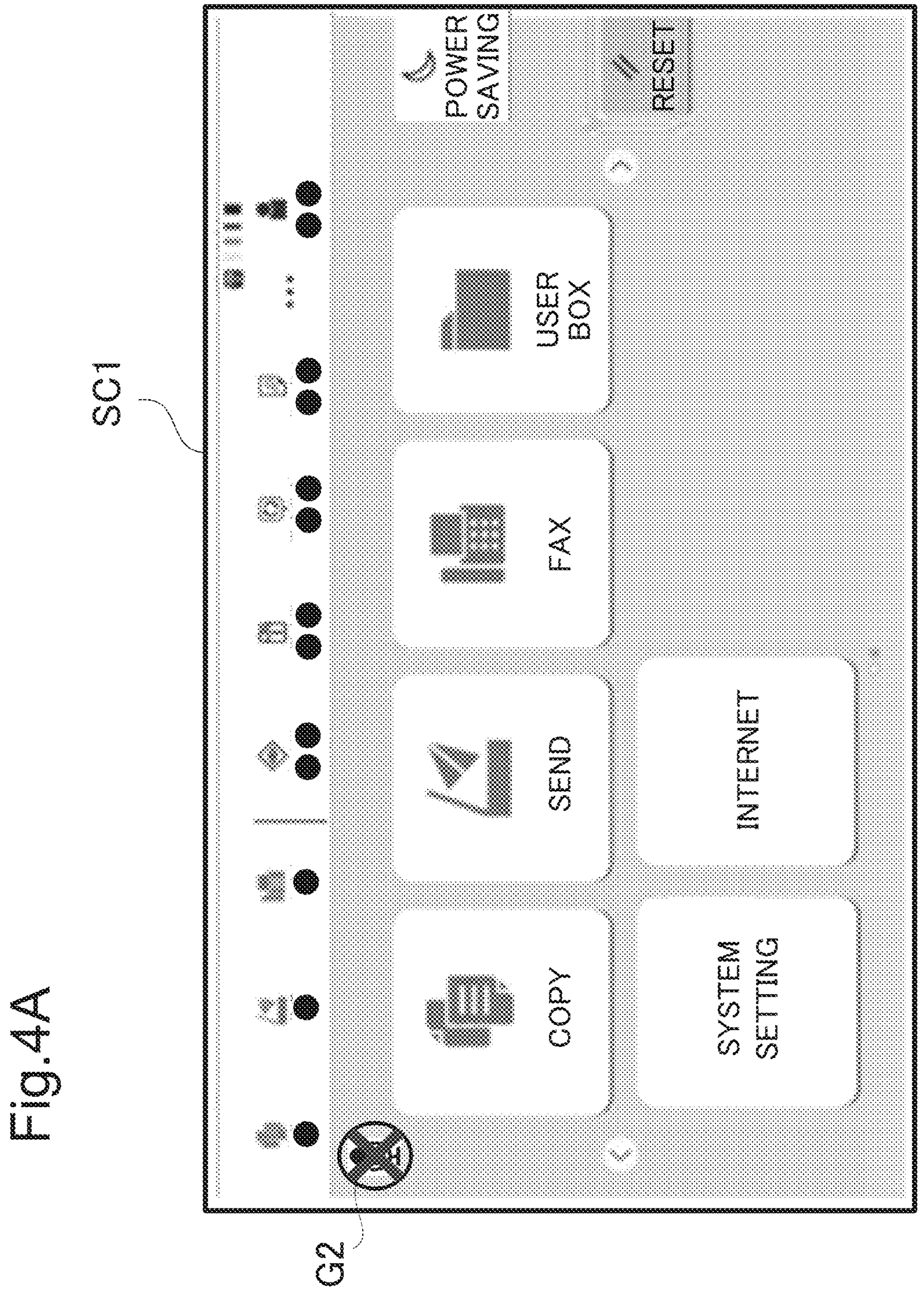

On the other hand, when the controller 100 turns off the microphone 22 and brings the microphone 22 into a state where a voice input is not possible, a sign G2 for an illustration of an image “x” superimposed on the sign G1 of the microphone is displayed on the operation screen SC1 and the operation screen SC2 (the left upper portion in FIGS. 3A and 3B) as in the example illustrated in FIG. 4A and FIG. 4B.

The voice analyzer 102 converts the electrical signal (voice data) converted by the microphone 22 into text data by using an existing voice recognition technique, analyzes the text data by using an existing natural language processing technique, and thereby recognizes the voice instruction from the user.

The receiver 103 receives, as instructions from the user, the instruction input by a manual input operation via the operation device 47 (including a touch panel) on the screen that is currently displayed on the display device 473 and the voice instruction (an analysis result of the voice analyzer 102) recognized by the voice analyzer 102 via the microphone 22. The controller 100 executes a job in accordance with content of the instructions received by the receiver 103.

The display controller 101 displays, on the display device 473, a setting screen displaying content indicated by the instruction input by a manual input operation or the above voice instruction. For example, when the operation screen SC2 of the setting screen illustrated in FIG. 3B is displayed on the display device 473, the user inputs instructions to set “Select paper” to “A4”, “Select color” to “Black and white”, and “Aggregate pages” to “2 in 1” via the operation device 47, and the receiver 103 receives the instructions. At this time, the display controller 101 displays, on the display device 473, the operation screen SC2 (setting screen) that displays, in a switched manner, the setting for “Select paper” from “Auto” to “A4”, the setting for “Select color” from “Full color” to “Black and white”, and the setting for “Aggregate pages” from “Off” to “2 in 1” as illustrated in FIG. 5.

Once the user utters the keyword “black and white copy” when the operation screen SC1 illustrated in FIG. 3A is displayed on the display device 473, and the receiver 103 receives the voice instruction via the speaker 23 and the voice analyzer 102, the display controller 101 displays the operation screen SC2 as illustrated in FIG. 6 on the display device 473.

When the controller 100 turns on the microphone 22 and is brought it into a state where a voice input is possible, the controller 100 does not execute a predefined job for a predefined period of time (2 minutes, for example) and executes it after waiting, or prohibits and does not execute the predefined job. Hereinafter, the description “not executing” or “prohibiting” a job means that the job is not executed for a predefined period of time and is then executed after waiting or the job is prohibited and is not executed in this manner. Note that an expression of not executing the job and waiting literally means not executing the job and waiting. Also the above “predefined job” is (i) a job specified by a manufacturer, a developer, or the like of the image forming apparatus 1 on the basis of their subjective view because generated sound caused therefor by the image forming apparatus 1 is large (that is, a job defined in advance as causing the image forming apparatus 1 to generate a large sound), (ii) a job operating with operation sound of no less than a predefined sound volume (80 dB, for example), or the like. The “predefined job” is store as a part of the above control program, or is stored in advance in a non-volatile memory or the like incorporated in the control device 10.

For example, the controller 100 prohibits execution of a job including stapling and punching of the post-processing device 31 when the microphone 22 is turned on and is in the state where a voice input is possible. As a specific example, even if an execution start timing of a print job including stapling arrives, the print job is not allowed to start when the microphone 22 is in the state where a voice input is possible. The controller 100 executes the predefined job when the microphone 22 is turned off and is in the state where a voice input is not possible.

However, the controller 100 causes a predefined job with high importance to be executed even if the microphone 22 is in the state where a voice input is possible. For example, when a person who has requested execution of a job is a predefined specific person (a person of a management level or higher), the controller 100 determines that importance of the job is high. For example, in a case where the image forming apparatus 1 is shared, log-in information such as individual ID information is input by the user operating the operation device 47, the controller 100 is adapted to approve the log-in if the individual ID information indicated by the input log-in information conforms to individual ID information of a qualified user stored in advance, and further, when an instruction to execute a job is input by the user operating the operation device 47 in a case where the individual ID information of the approved user conforms to individual ID information of a stored predefined specific person, the controller 100 causes the job to be executed as a predefined job with high importance even if the microphone 22 is in the state where a voice input is possible.

Figure 7:
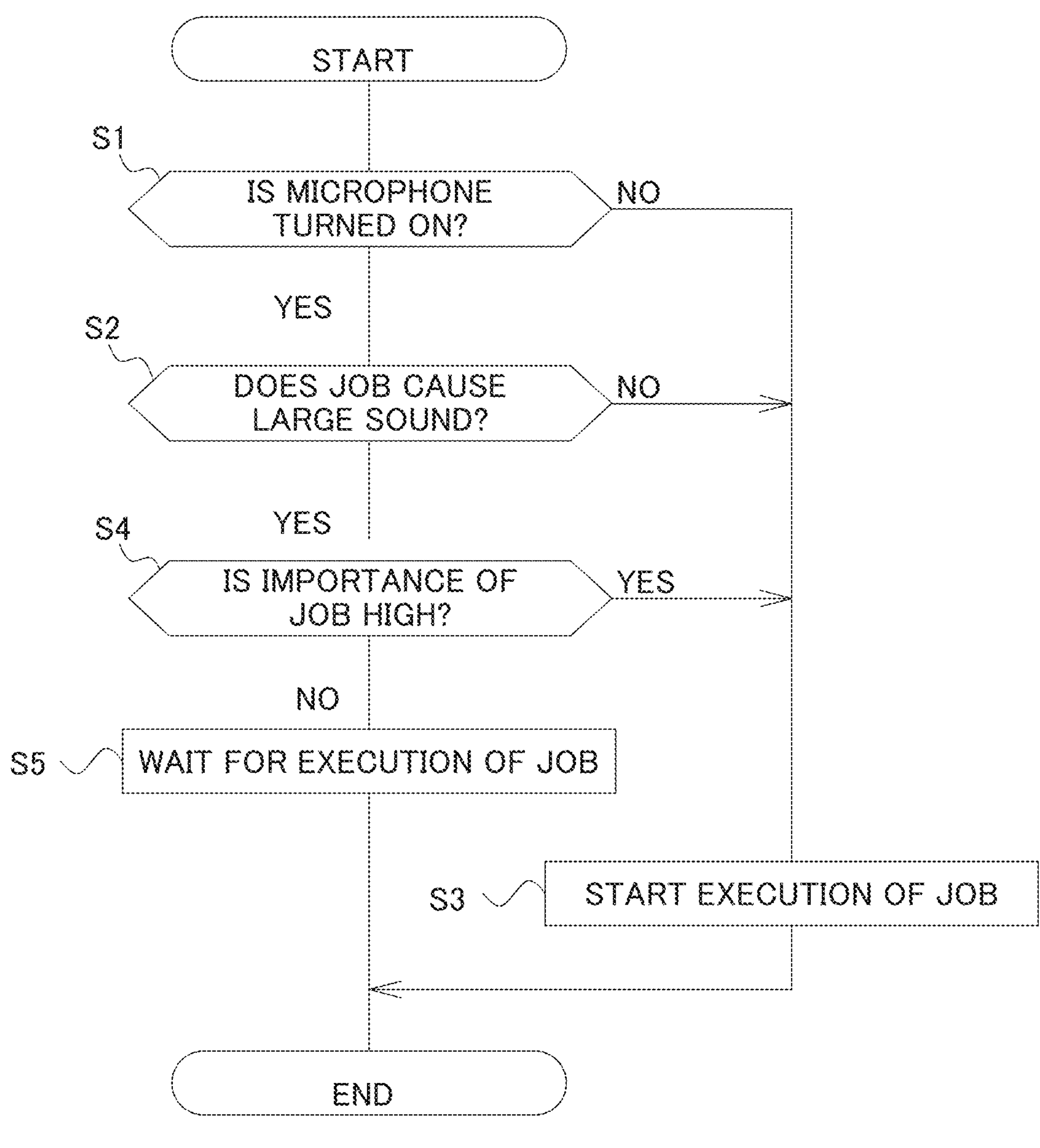
FIG. 7 is a flowchart illustrating an example of processing performed by a control device in the image forming apparatus.

Next, an example of processing performed by the control device 10 of the image forming apparatus 1 will be described on the basis of the flowchart illustrated in FIG. 7. Note that the processing is processing performed when a job execution start timing arrives.

The controller 100 determines whether the microphone 22 is in the state where a voice input is possible, that is, whether the microphone 22 is in an ON state (S1). Here, in a case where it is determined that the microphone 22 is not in the state where a voice input is possible (NO in S1), the controller 100 causes the job to be executed (S3).

On the other hand, in a case where it is determined that the microphone 22 is in the state where a voice input is possible (YES in S1), the controller 100 further determines whether the job is the above predefined job (S2). Here, in a case where it is determined that the job is not the predefined job (NO in S2), the controller 100 causes the job to be executed (S3). The processing is then ended.

On the other hand, in a case where it is determined that the job is the above predefined job (YES in S2), the controller 100 determines whether the job is a predefined job with high importance (S4).

In a case where it is determined that the job is a predefined job with high importance (YES in S4), the controller 100 causes the job to be executed (S3). The processing is then ended.

Also, in a case where it is determined that the job is not a predefined job with high importance (NO in S4), the controller 100 does not execute the job and waits for a predefined period of time (2 minutes, for example) (S5). The controller 100 causes the job to be executed after elapse of the predefined period of time. The processing is then ended. Note that, in a case where it is determined that the job is not a predefined job with high importance (NO in S4), the controller 100 may cancel the job without causing the job to be executed (S5).

In this manner, according to the above embodiment, the controller 100 does not execute the above predefined job when the microphone 22 is in the state where a voice input is possible, and it is thus possible to avoid a situation in which a voice instruction is not accurately input due to noise or the like. In other words, it is possible to prohibit execution of stapling and punching causing relatively large driving sounds when a voice input to the microphone 22 is possible, thereby reducing the probability of noise or the like being input to the microphone 22 at the time of a voice input, and to allow a voice instruction to be accurately received.

A further embodiment will be described. For example, in a case where the image forming apparatus 1 selectively operates in an ordinary mode in which each operation mechanism such as the image forming device 12 is caused to operate normally and a silent mode in which each operation mechanism such as the image forming device 12 is caused to operate with driving noise of the image forming apparatus 1 reduced under control of the controller 100, and when the microphone 22 is in the state where a voice input is possible, the controller 100 may perform control of setting the image forming apparatus 1 in the above silent mode and then immediately causing the image forming apparatus 1 to execute the above predefined job, instead of the above control of not executing the predefined job.

Figure 8:
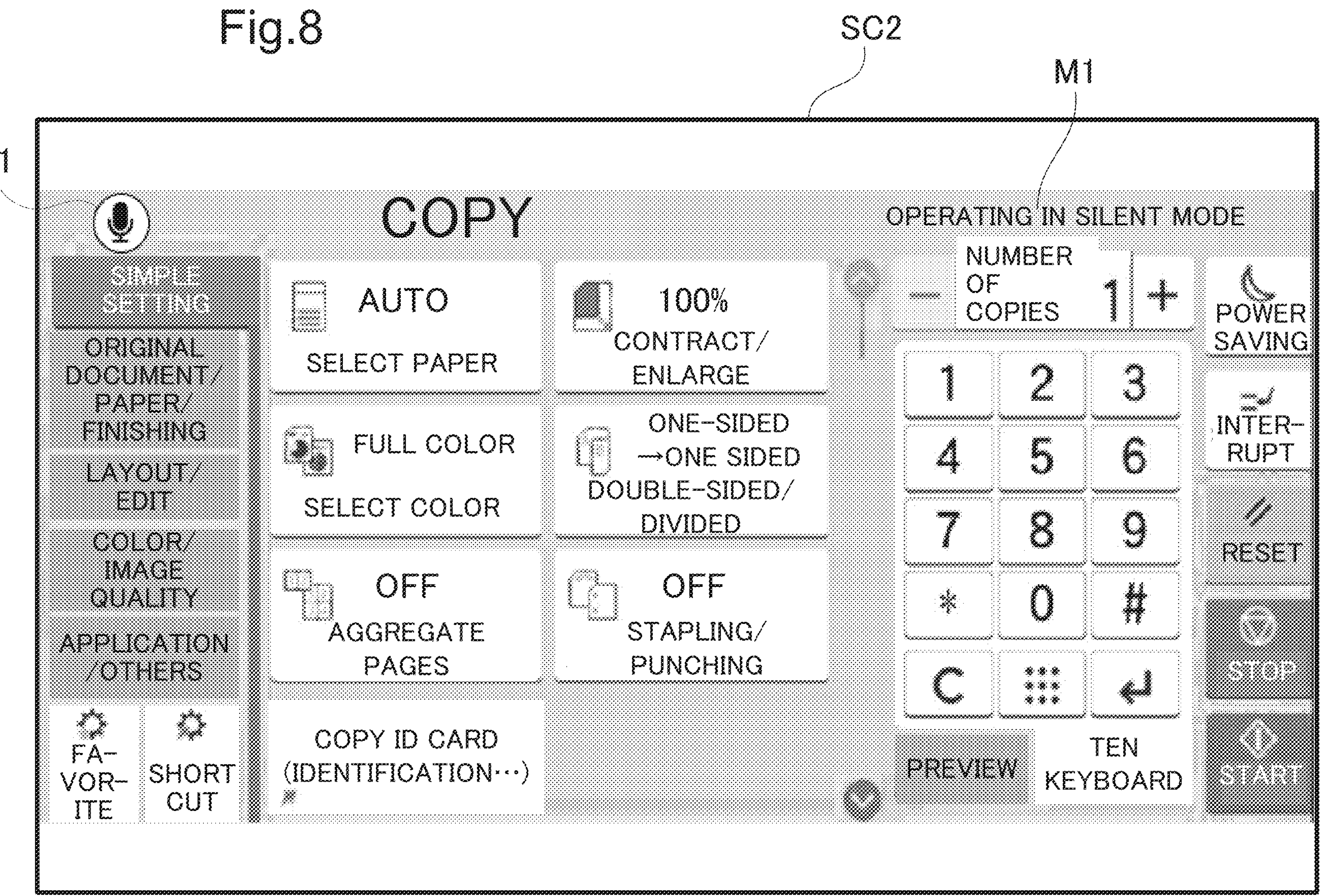
FIG. 8 is a diagram illustrating an example of the operation screen displayed on the display device.

In this manner, it is possible to avoid degradation of job execution performance of the image forming apparatus 1 as much as possible while reducing a probability of noise being input to the microphone 22. Note that it is preferable that, in a case where the controller 100 has brought the microphone 22 into the state where a voice input is possible and has set the silent mode, the display controller 101 cause the display device 473 to display a message for notifying the user of the fact that the silent mode has been set as in the example illustrated in FIG. 8. As in the example illustrated in FIG. 8, a message M1 "Operating in silent mode" is displayed on the operation screen SC2 (the right upper portion on the operation screen SC2 in FIG. 8).

A further embodiment will be described. In a case where the post-processing device 31 can perform switching between the automatic stapling mode of automatically performing stapling under control of the controller 100 or the like and the manual stapling mode of manually performing the stapling on the basis of an operation of the user and causing a relatively large operation sound, the controller 100 controls operations of the post-processing device 31 by selectively switching the automatic stapling mode and the manual stapling mode. When the microphone 22 is in the state where a voice input is possible in this state, the controller 100 does not cause the post-processing device 31 to operate in the above manual stapling mode. In other words, the controller 100 prohibits the operation of the post-processing device 31 in the above manual stapling mode as the above predefined job.

Also, once an instruction to perform switching to the manual stapling mode is input by the user to the operation device 47 when the microphone 22 is in the state where a voice input is possible in this case, the display controller 101 causes the display device 473 to display a message indicating that switching to the manual stapling mode is prohibited and that it is necessary to bring the microphone 22 into the state where a voice input is not possible in order to release the prohibition. Note that, in this case, the display controller 101 functions as the "controller" in the claims. For example, the display controller 101 causes the display device 473 to display a pop-up screen PU with a description of a message M2 as in the example illustrated in FIG. 9.

Also, when the microphone 22 is in the state where a voice input is possible and the instruction to perform switching to the manual stapling mode is input by the user to the operation device 47 in this manner, the controller 100 may cause the speaker 23 to output the above message.

Note that the controller 100 brings the microphone 22 into the state where a voice input is not possible in accordance with an instruction to turn off the microphone 22 input by the user to the operation device 47.

Also, although the controller 100 turns on the microphone 22 and brings it into a state where a voice input is possible once a predefined voice input start condition is established (for example, if the human sensor 21 detects approaching of a person), the controller 100 performs control such that the microphone 22 is not brought into the state where a voice input is possible even if the above voice input start condition is established when the post-processing device 41 is caused to operate in the manual stapling mode. In other words, the controller 100 does not bring the microphone 22 into the ON state and keeps it in the OFF state even if a person approaches the image forming apparatus 1 when the post-processing device 41 is switched to and is operating in the manual stapling mode.

Note that although the case where voice data that is collected by the microphone 22 and converted is analyzed by the voice analyzer 102 in the image forming apparatus 1 has been described above, a speaker that is called a smart speaker, incorporates a microphone therein, and has an artificial intelligence (AI) assistant function may be employed, a user's voice may be collected by the speaker, and the image forming apparatus 1 may use the speaker as a voice input device and receive, by the receiver 103, a voice analysis result from the speaker in a further embodiment.

The present invention is not limited to the configurations of the above embodiments, and various modifications can be made. Also, in regard to the above embodiments, the configurations and the processing illustrated in the embodiments by using FIGS. 1 to 9 are only some embodiments of the present invention, and the present invention is not intended to be limited to the configurations and the processing.

The invention claimed is:

1. An image forming apparatus that includes an image forming device that forms an image on a recording medium, the image forming apparatus comprising:

a voice input device that receives an input of voice from a user; and a control device that includes a processor and, through the processor executing a control program, acts as:

a receiver that receives a voice instruction based on the voice input to the voice input device; and a controller that executes a job in accordance with content of the voice instruction received by the receiver, wherein the controller is capable of selectively setting an ordinary mode in which the image forming apparatus operates normally, and a silent mode in which the image forming apparatus operates with reduced driving sound, and the controller causes the image forming apparatus to execute a predefined job in which the image forming apparatus operates with driving sound of not less than a predetermined sound volume, in the silent mode when the voice input device is brought into a state where the voice is input, and causes the image forming apparatus to execute the predefined job, in the ordinary mode, when the voice input device is not in a state where the voice is input.

2. The image forming apparatus according to claim 1, wherein the controller immediately executes a predefined job with high importance even in a case where the voice input device is brought into the state where the voice is input.

3. The image forming apparatus according to claim 1, further comprising:

a display device; and a display controller that controls a display operation of the display device, wherein when the voice input device is in the state where the voice is input and the silent mode is set, the display controller causes the display device to display a message to notify the user of a fact that the silent mode is set.

4. An image forming apparatus that includes an image forming device that forms an image on a recording medium, the image forming apparatus comprising:

a voice input device that receives an input of voice from a user; and a control device that includes a processor and, through the processor executing a control program, acts as:

a receiver that receives a voice instruction based on the voice input to the voice input device; and a controller that executes a job in accordance with content of the voice instruction received by the receiver, wherein the controller performs control of not executing a predefined job at least for a predefined period of time when the voice input device is brought into a state where the voice is input, and executing the predefined job when the voice input device is not in a state where the voice is input, wherein the image forming apparatus further comprises:

a post-processing device that performs stapling on recording paper with an image recorded thereon, wherein the controller controls operations of the post-processing device by switching an automatic stapling mode of automatically performing the stapling and a manual stapling mode of manually performing the stapling, and when the voice input device is in the state where the voice is input, the controller does not execute, as the predefined job, an operation of the post-processing device in the manual stapling mode at least for a predefined period of time.

5. The image forming apparatus according to claim 4, wherein when the post processing device is caused to operate in the manual stapling mode, the controller does not bring the voice input device into the state where the voice is input.

6. The image forming apparatus according to claim 4, further comprising:

a notification device; and an operation device that receives an input of an instruction through an operation by the user, wherein in a case where an instruction to cause the post-processing device to operate in the manual stapling mode is input when the voice input device is in the state where the voice is input, the controller causes the notification device to provide a message indicating that it is necessary to bring the voice input device into the state where the voice is not input in order to cause the post-processing device to operate in the manual stapling mode.

* * * * *